United States Patent
Aoki

[19]
[11] Patent Number: 5,983,090
[45] Date of Patent: Nov. 9, 1999

[54] MOBILE COMMUNICATION SYSTEM WITH ACCESS FUNCTION TO COMPUTER NETWORK

[75] Inventor: Takayasu Aoki, Tokyo, Japan

[73] Assignee: Kabushiki Kaisha Toshiba, Kawasaki, Japan

[21] Appl. No.: 08/829,938

[22] Filed: Apr. 1, 1997

[30] Foreign Application Priority Data

Apr. 2, 1996 [JP] Japan .................................. 8-080150

[51] Int. Cl.⁶ .................................................. H04Q 7/38
[52] U.S. Cl. ........................ 455/403; 455/464; 370/329; 370/393
[58] Field of Search ..................... 455/403, 450, 455/451, 433, 435, 436, 456, 507, 452, 517, 411, 466, 464; 370/329, 349, 352, 389, 390, 351, 392, 393, 420, 463, 328, 338, 409, 401, 402, 466, 467; 395/200

[56] References Cited

U.S. PATENT DOCUMENTS

| | | | |
|---|---|---|---|
| 5,239,577 | 8/1993 | Bates et al. | 379/201 |
| 5,410,543 | 4/1995 | Seitz et al. | 340/825.05 |
| 5,506,888 | 4/1996 | Hayes et al. | 455/445 |
| 5,519,706 | 5/1996 | Bantz et al. | 455/435 |
| 5,526,353 | 6/1996 | Henley et al. | 370/392 |
| 5,608,786 | 3/1997 | Gordon | 370/352 |
| 5,708,655 | 1/1998 | Toth et al. | 340/825.52 |
| 5,715,243 | 2/1998 | May | 370/349 |
| 5,757,924 | 5/1998 | Friedman et al. | 380/49 |
| 5,774,803 | 6/1998 | Kariya | 455/414 |
| 5,793,762 | 8/1998 | Penners et al. | 370/352 |
| 5,805,587 | 9/1998 | Norris et al. | 370/352 |
| 5,815,664 | 9/1998 | Asano | 370/392 |

FOREIGN PATENT DOCUMENTS 9327076  3/1997  Japan ............................ H04Q 7/38

*Primary Examiner*—Dwayne D. Bost
*Assistant Examiner*—Jean A. Gelin
*Attorney, Agent, or Firm*—Oblon, Spivak, McClelland, Maier & Neustadt, P.C.

[57] ABSTRACT

In a mobile communication system, when a mobile station (PS1 to PS*j*) makes a request for connection to a service provider (SP), a base station (BS1 to BS*n*) acquires an IP address "IP1" assigned for the base stations and assigns to the requesting mobile station an IP address "IP2" for the mobile stations that has been acquired in advance in place of the IP address "IP1". When data transfer is started, the base station changes the source address in data sent by the mobile station from "IP2" to "IP1" and then transfers the resulting data to the service provider. On the other hand, the base station changes the destination address of data sent by the service provider from "IP1" for the base stations to "IP2" for the mobile stations for subsequent transfer to the mobile station.

11 Claims, 7 Drawing Sheets

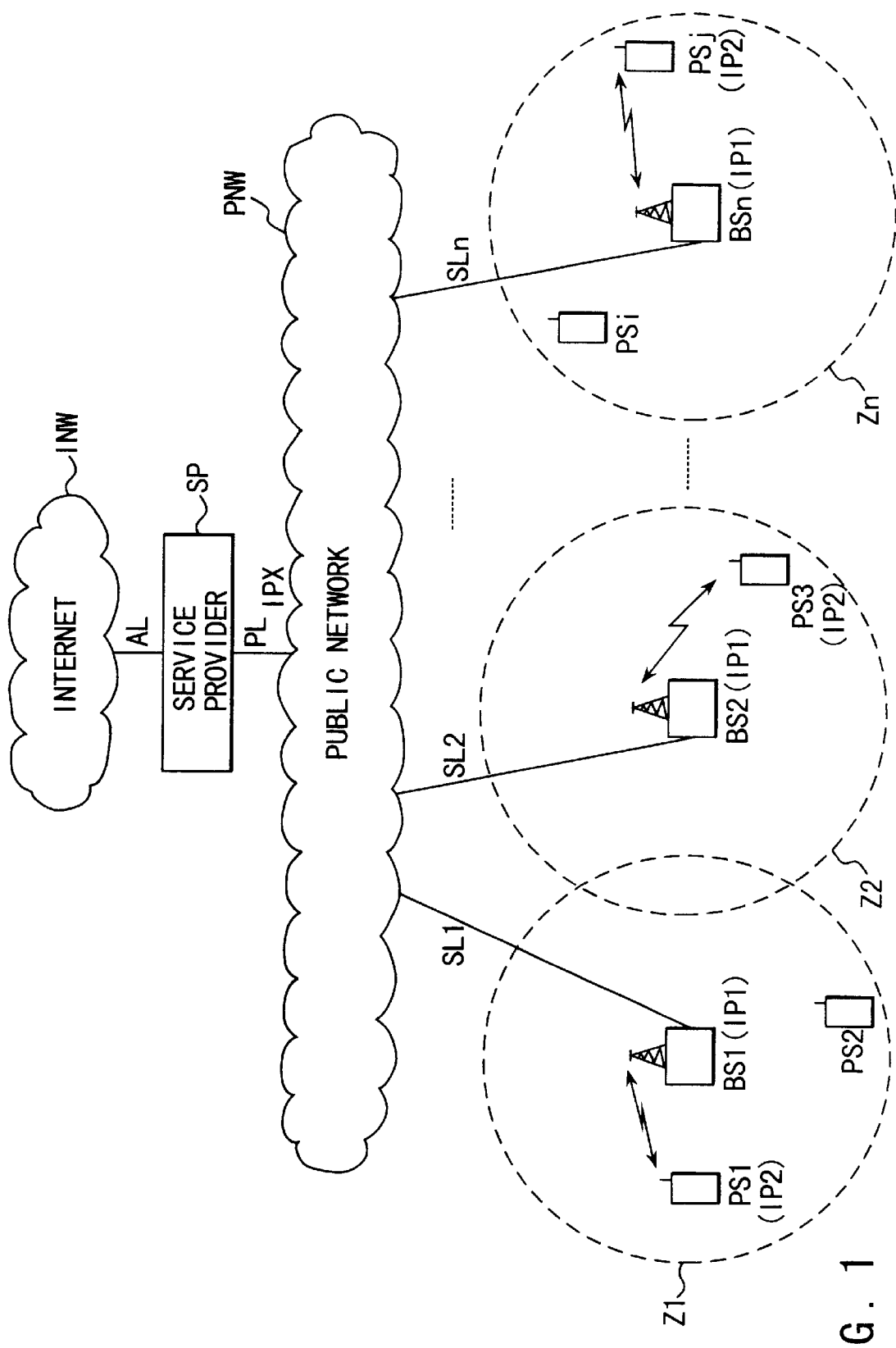
F I G. 1

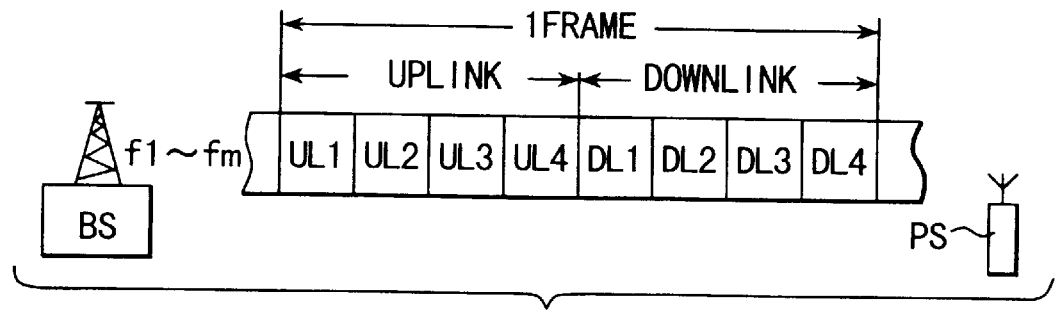
F I G. 3
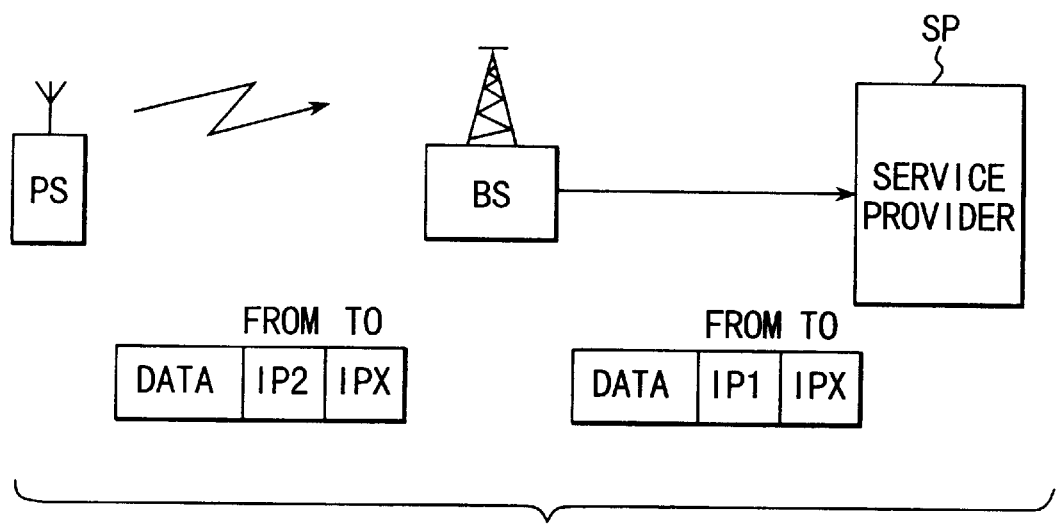
F I G. 4
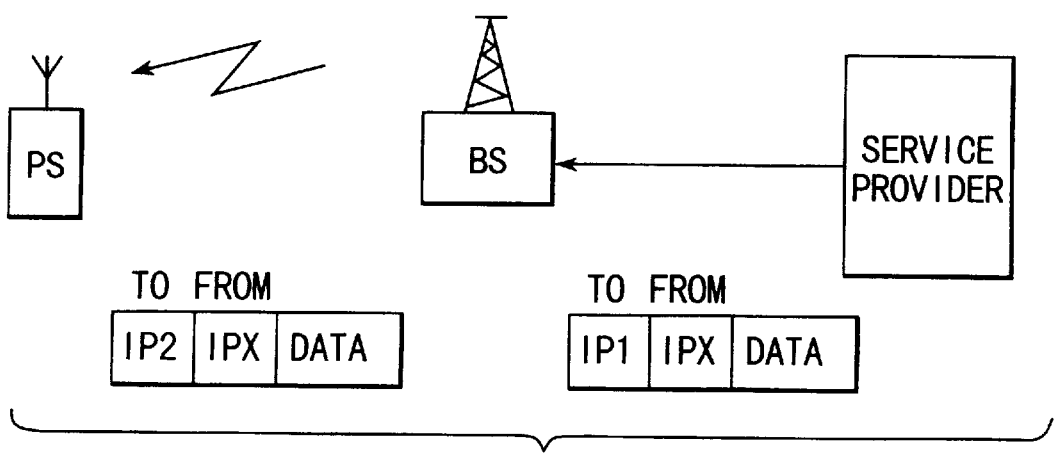
F I G. 5

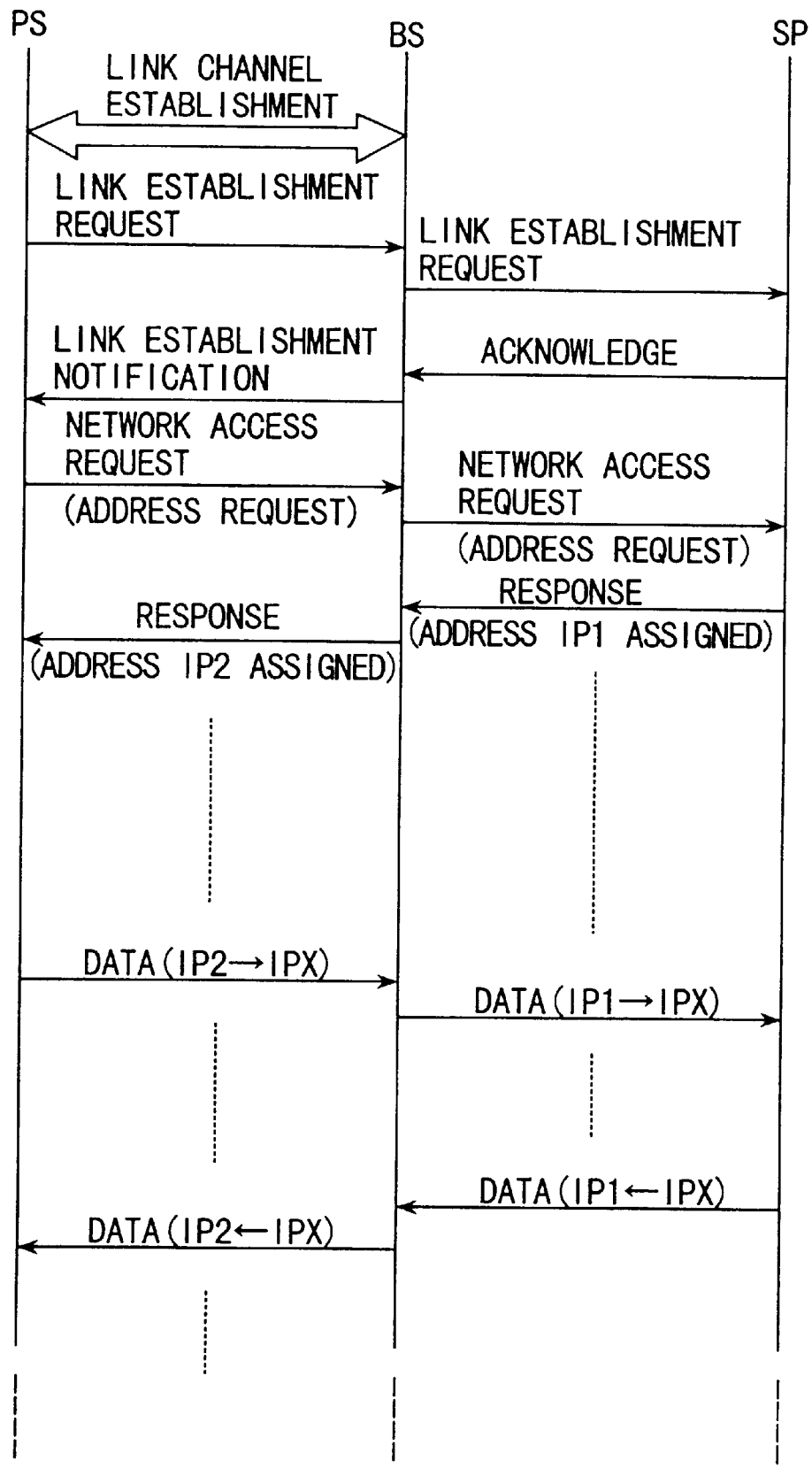
F I G. 6

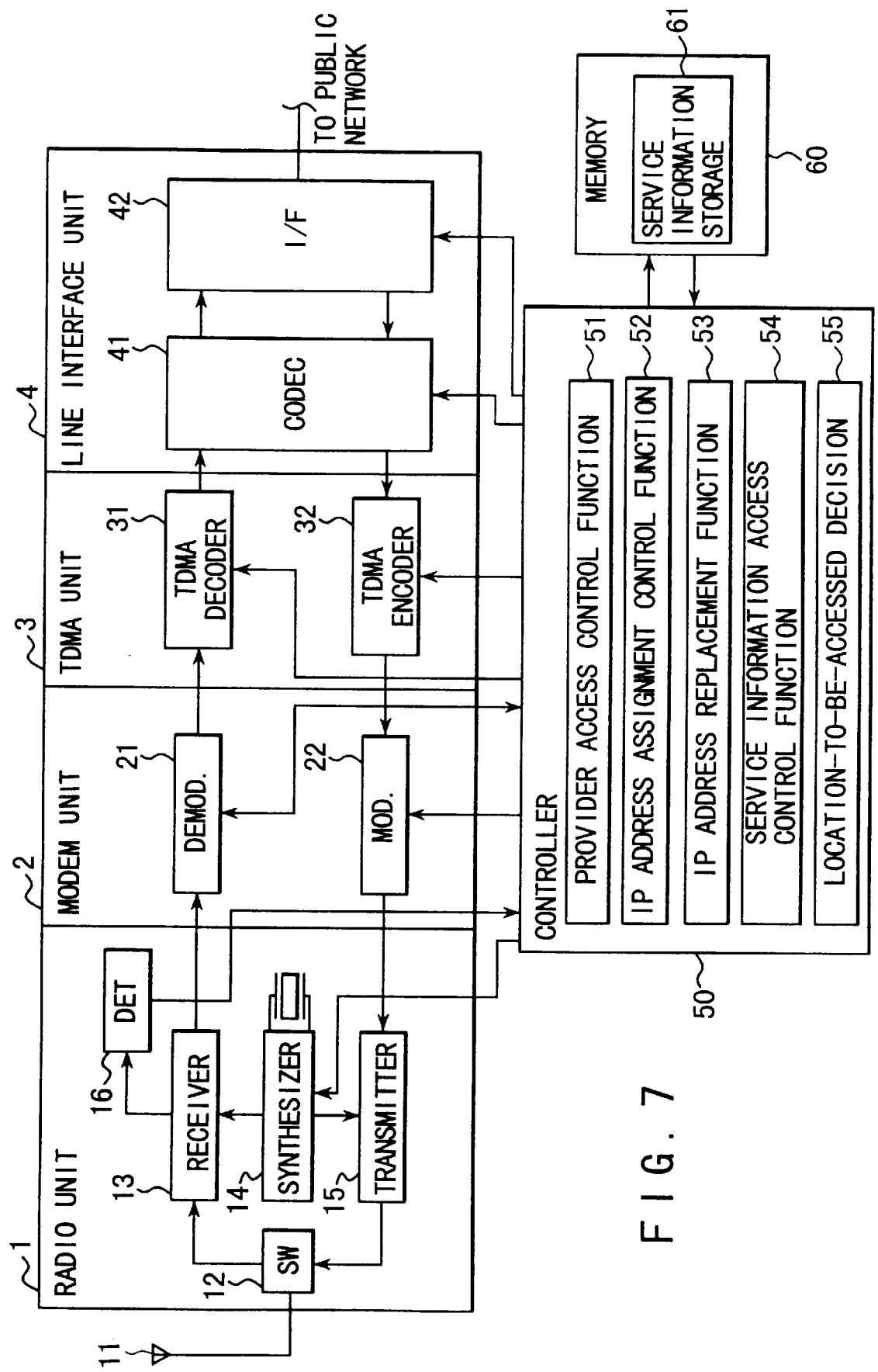
F I G. 7

MOBILE COMMUNICATION SYSTEM WITH ACCESS FUNCTION TO COMPUTER NETWORK

BACKGROUND OF THE INVENTION

The present invention relates to a cellular mobile communication system such as a mobile telephone system or a cordless telephone system, and more specifically to a system having a function of making access to a computer network such as Internet.

With the recent spread of mobile communication systems, such as cellular telephone and cordless telephone systems, etc., attention has been paid to so-called mobile computing which allows radio terminals used in these systems to make access to Internet.

In mobile computing using the dialup IP connection scheme that is the most common one, the public network is first called by a radio terminal through a radio base station and the server of a service provider is then called via the public network. The server of the service provider assigns an IP address to the calling radio terminal via the public network and the radio base station. After that, the use of the IP address thus acquired permits the radio terminal to make access to Internet over the radio base station, the public network, and the server of the service provider.

To make access to Internet via the service provider in this manner, each user is individually requested beforehand to register himself or herself with the service provider. On the other hand, some of companies, department stores and hotels have been making an attempt to register as an organization with the service provider and to allow each staff or customer to make access to Internet through the use of their respective privatemobile communications systems.

However, the conventional mobile communications systems merely connect the calling user terminal and the service provider server by a communications link including a radio channel only. For this reason, even with the use of the private mobile communications system registered as an organization with the service provider, each user cannot make access to Internet unless he or she registers himself or herself with the service provider.

BRIEF SUMMARY OF THE INVENTION

It is a first object of the present invention to provide a mobile communication system which allows users to make access to a computer network, such as Internet, with no need for each of the users to register with a service provider.

To attain the first object, in the mobile communication system of the present invention, a first address is acquired from the provider when a mobile station makes a request for connection to the computer network and the requesting mobile station is assigned a second address acquired in advance in place of the first address. When the mobile station sends data that makes the second address its source address, the source address is changed from the second address to the first address and the data subjected to address replacement is transferred to the provider. On the other hand, when data containing the first address as a destination address is sent from the provider, the destination address is changed from the first address to the second address and the data subjected to address replacement is transferred to the mobile station.

The address assignment and replacement functions may be incorporated in each of base stations, or an switching or control unit within a communication network.

According to the present invention, data transfers between mobile stations and base stations or the communication network are made by the user of the second address uniquely assigned to the mobile stations by the mobile communication system, and data transfers between the base stations and the communication network or computer network are made by the use of the first address assigned to the system by the provider. Thus, it becomes possible for even a mobile station that is not registered with the provider to make access to the computer network, such as Internet, via the provider by utilizing the mobile communication system that is registered as an organization with the provider.

A second object of the present invention is to provide a mobile communication system which permits service information the communication system provides to be easily obtained without making access to a computer network such as Internet.

To attain the second object, the mobile communication system a storage unit for storing service information prepared in advance and a service information transfer function. When a signal to make a request for retrieval of the service information is sent from a mobile station, the service information is read from the storage unit, then sent to the requesting mobile station.

To be specific, a plurality of base stations form their respective radio zones and, for each of the radio zones, local service information peculiar to the area is created and stored in the storage unit. When a request for local service information is sent from a mobile station, the radio zone where it is situated is determined and local service information peculiar to that radio zone is selectively read from the storage unit, then sent to the requesting mobile station.

Thus, the mobile communication system of the present invention allows a user at each mobile station to obtain local service information, such as an area map, information about noted places, etc., that has been created uniquely by the mobile communication system with no need to make access to the computer network such as Internet.

A third object of the present invention is to provide a mobile communication system which permits a location to be accessed to be changed easily even in a state where a radio link remains held.

To attain the third object, the mobile communication system of the present invention is provided with a decision function of, when data is sent from a mobile station, deciding whether a destination address contained in the data is a third address for the mobile communication system acquired in advance or a fourth address other than the third address. When the decision is the third address, local service information is read from the storage unit according to the data contents, then sent to the sending mobile station. On the other hand, when the decision is the fourth address, the first address is acquired from the provider and the source address contained in the data from the mobile station is changed from the second address to the first address. The resulting data is sent to the provider.

According to the present invention, therefore, when a mobile station sends data to access the computer network while accessing local service information of the mobile communication system, the location to be access is automatically changed to the provider with the radio channel between the mobile station and the base station held. For this reason, there is no need for the mobile station to disconnect the radio channel for subsequent retransmission and make another request for connection to the provider.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic illustration of a first embodiment of a mobile communications system of the present invention;

FIG. 3 is a schematic diagram of a radio link between base and mobile stations in the system of FIG. 1;

FIG. 4 is a diagram for use in explanation of data transmission in uplink direction in the first embodiment;

FIG. 5 is a diagram for use in explanation of data transmission in downlink direction in the first embodiment;

FIG. 6 illustrates the connection sequence of the mobile communications system of the first embodiment;

FIG. 7 is a circuit block diagram of a base station in a second embodiment of the mobile communications system of the present invention;

DETAILED DESCRIPTION OF THE INVENTION (First Embodiment)

Referring now to FIG. 1, there is illustrated a first embodiment of a mobile communications system of the present invention, which is equipped with multiple base stations BS1 to BS$n$ that are distributed throughout a service area. The base stations form their respective radio zones Zl to Z$n$. The diameter of the radio zones is set to 100 to 500 meters for a cordless phone system and to several kilometers for a cellular phone system. In the radio zones Zl to Z$n$, each of mobile stations PS1 to PS$j$ is connected to a corresponding one of the base stations BS1 to BS$n$ by a radio channel.

To connect the mobile stations PS1 to PS$j$ and the base stations BS1 to BS$n$ by radio channels, the four-channel multiplex multi-carrier TDMA (Time Division Multiple Access)—TDD (Time Division Duplex) technique is used by way of example. In this technique, as shown in FIG. 4, a transmit signal frame sent on each of radio frequencies f1 to f$n$ is made up of four time slots UL1 to UL4 for uplink from mobile station PS to base station and four time slots DL1 to DL4 for downlink from base station BS to mobile station PS. Four pairs of time slots are made by combining one of the uplink time slots UL1 to UL4 with one of the downlink time slots DL1 to DL4 and each pair of time slots is assigned to a mobile station as a two-way radio channel, thereby allowing radio communication between the mobile station and a base station. That is, a single radio frequency provides four two-way radio channels.

The Personal Handyphone System (PHS) that is now used in Japan employs 37 radio frequencies (f1 to f37), f12 and f18 being used for control purposes and the other frequencies being used for communication. Of the radio frequencies for communication, f1 to f10 are used for direct communication between mobile stations and the remaining frequencies are used for communication with a public network via base stations and communications between base stations installed in homes and mobile stations.

Each of the base stations BS1 to BS$n$ is connected by a corresponding one of subscriber lines SL1 to SLN to a public network PNW, which, in turn, is connected to a service provider SP by a private line PL. The service provider SP establishes connections between the base stations BS1 to BS$n$ and Internet INW on demand. The public network consists of an integrated service digital network (ISDN).

In this embodiment, the mobile communication system is registered as an organization with the service provider SP. Owing to this registration, the mobile communication system is assigned a fixed IP address "IP2" in advance by the service provider SP. The IP address "IP2" is assigned to each of the mobile stations BS1 to BS$n$ when it issues a request for connection to Internet INW.

Figure 2:
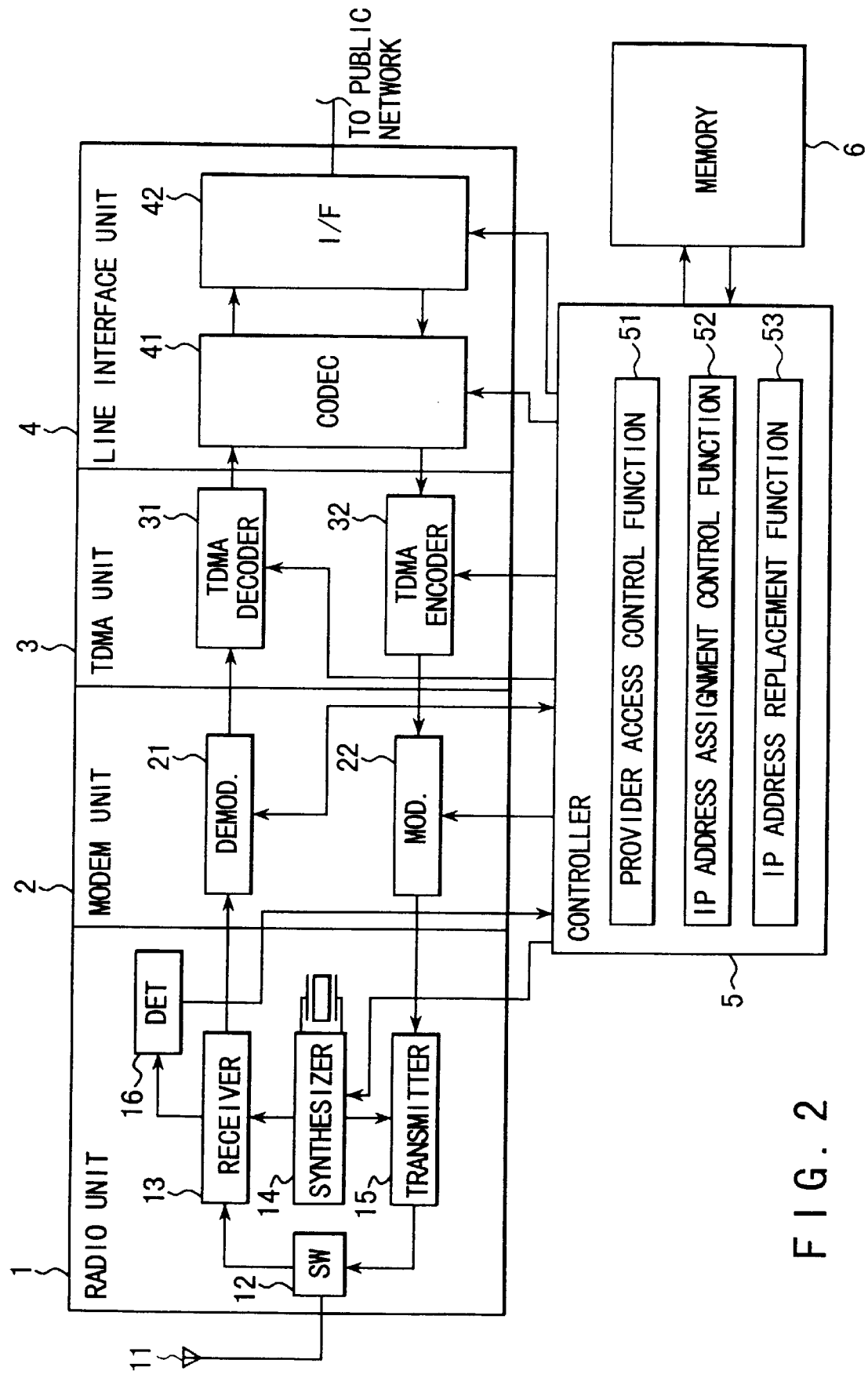
FIG. 2 is a circuit block diagram of the base station used in the system of FIG. 1.

As shown in FIG. 2, each of the base stations BS1 to BS$n$ is composed of a radio unit 1 equipped with an antenna, a modem 2, a TDMA unit 3, a line interface unit 4, a controller 5, and a memory 6.

A radio frequency signal sent over a radio channel by a mobile station is received by the antenna 11 and then entered into a receiver 13 via a switch 12 for switching between sending and receiving. In the receiver 13, the received radio frequency signal is mixed with a local oscillation signal generated by a frequency synthesizer 14 for conversion into an intermediate frequency signal. The frequency of the local oscillation signal generated by the synthesizer 14 is specified by the controller 5. The radio unit 1 is equipped with a received electric field strength detector (RSSI-DET) 16 for detecting the strength of the radio frequency signal sent from the mobile station. The detected value is presented to the controller 5.

The intermediate frequency signal output from the receiver 13 is applied to a demodulator 21 of the modem 2. In the demodulator 21, the intermediate frequency signal is subjected to digital demodulation, whereby a digital communication signal is recovered.

In a TDMA decoder 31 of the TDMA unit 3, the digital communication signal is separated with each time slot and the resulting digital communication signals are input to the line interface unit 4.

The line interface unit 4 has a codec 41 and an interface (I/F) 42. The digital communication signals are subjected in the codec 41 to error correction and voice decoding for conversion to baseband digital communication signals and then sent from the interface 42 through the corresponding subscriber line to the public network PNW.

On the other hand, an incoming digital communication signal sent from the public network PNW over the corresponding subscriber line is input via the interface 42 to the codec 41 where it is subjected to voice encoding and error correction and then input to a TDMA encoder 32 of the TDMA unit 3. In the TDMA encoder 32, voice data output from the codec 41 are time-slot multiplexed with voice data associated with other channels. Transmit data output from the TDMA encoder 32 is input to a modulator 22 which converts it to a digital modulated signal. A transmitter 15 converts the digital modulated signal to a radio frequency signal by mixing it with a local oscillation signal generated by the synthesizer 15 and amplifies the radio frequency signal up to a predetermined transmission power level. The radio frequency signal from the transmitter 15 is transmitted to the mobile stations via the switch 12.

The memory 6 consists of, for example, a semiconductor memory, such as ROM, RAM, or the like, or a hard disk, in which control programs for the controller 5, various pieces of control data, a protocol for making access to the service provider SP, and the IP address "IP2" assigned in advance by the service provider SP are stored.

The controller 5, equipped with a microcomputer as its main control unit, has a provider access control function 51, an IP address assignment control function 52, and an IP address replacement control function 53 in addition to normal applications such as a radio link control function and so on.

The provider access control function 51 responds a request for connection to the service provider SP issued by a mobile station SP to establish a communication link with the service provider in accordance with a protocol, such as TCP/IP (Transmission Control Protocol/Internet Protocol), and then obtains an IP address "IP1" for the base station from the service provider SP.

The IP address assignment control function 52 assigns to that mobile station SP which issued a request for connection to the service provider SP the IP address "IP2" for mobile stations that has been acquired in advance in place of the IP address "IP1" just acquired from the service provider.

When the base station receives data sent from the mobile station PS toward the service provider SP, the IP address replacement function 53 replaces the IP address "IP2" indicating the sending end and appended to that data with the IP address "IP1" for base stations. Also, it changes the IP address which indicates the location to which the data is to be directed and which is appended to the data sent from the service provider SP from the "IP1" for base stations to the "IP2" for mobile stations.

Next, the operation of the mobile communication system thus arranged will be described taking a request for connection to the service provider SP sent from the mobile station SP1 to the base station BS1 by way of example. FIG. 6 shows a sequence illustrating the operation.

First, when a dialup connection operation is performed in the mobile station SP1, a radio communication link is set up between the mobile station SP1 and the base station BS1. When, in this state, the mobile station PS1 sends a request to establish a link with the service provider SP, the base station BS1 sends data necessary to establish a link to the server of the service provider SP to thereby make a request to establish a link. In response to this, the server sends an acknowledge signal to the base station BS1 after making sure that the received data satisfies predetermined conditions. Upon receipt of the acknowledge signal, the base station BS1 notifies the connection requesting mobile station PS1 that the link has been established.

Upon receipt of that notification, the mobile station PS1 next issues to the base station BS1 a request for Internet access (request for an address). The server then assigns to the base station BS1 the IP address "IP1" for access to Internet. Upon receipt of the IP address "IP1", the base station BS1 holds it for itself and instead assigns to the mobile station BS1 the IP address "IP2" for mobile stations that has been provided in advance by the service provider SP. Thus, the mobile station BS1 becomes enabled for access to Internet. The base station BS waits for transmit data from the mobile station PS1.

Assume here that the mobile station PS1 sends data in which IPx is set as the destination address to make access to a certain server on the network and IP2 is set as the source address as shown in FIG. 4. When receiving the transmit data over a radio communication link, the base station BS1 replaces the IP address "IP2" indicating the location that sent the transmit data with the IP address "IP1" assigned to the base station by the service provider SP. The base station then sends the transmit data subjected to address replacement to the server of the service provider SP over the public network PNW as shown in FIG. 4.

On the other hand, assume that the server of the service provider SP sends to the base station BS1 data in which IPx is set as the source address and IP1 is set as the destination address. Upon receipt of the data over the public network PNW, the base station BS1 changes the address indicating the location to which the data is sent from the IP1 for base stations to the IP2 for mobile stations. The resulting data is sent to the mobile station over the radio channel.

After that, the base station BS1 makes data transfers between the mobile station PS1 and the service provider SP while making IP address replacement in the same manner as above.

As described above, with the mobile communication system of the present embodiment, when the mobile station PS makes a request for connection to the service provider SP, the base station BS acquires the IP address "IP1" for base stations from the service provider SP and assigns to the requesting mobile station PS the IP address "IP2" for mobile stations that has been acquired in advance in place of the IP address "IP1". When the data transfer is started, the base station changes the source address in data sent from the mobile station PS from IP2 to IP1 and then sends the data to the service provider SP. On the other hand, the base station BS changes the destination address in data sent from the service provider SP from IP1 to IP2 and then sends the data to the mobile station PS.

Therefore, any mobile station that is not individually registered with the service provider is allowed to make access to a computer network, such as Internet, via the service provider, provided that access is made through a mobile communication system that has been registered as an organization with the service provider.

A second embodiment of the present invention will be described next. FIG. 7 is a circuit block diagram of a radio base station BS in the second embodiment. In this figure, like reference numerals are used to denote corresponding parts to those in FIG. 2 and detailed descriptions thereof are omitted.

A memory 60 has a service information storage section 61, which, for each radio zone, stores information peculiar to that area. The service information includes, for example, an area map and information about noted stores and places within the area.

A controller 50 provides a service information access control function 51 and a location-to-be-accessed decision function 55 in addition to the provider access control function 51, the IP address assignment control function 52, and the IP address replacement control function 53.

Upon receipt of data bound for the base station from a mobile station, the service information access control function 54 makes access to the service information storage section 61 within the memory 60 on the basis of the data contents to thereby read service information requested by the mobile station. The service information is then sent to the mobile station.

Each time data is received from a mobile station, the location-to-be-accessed decision function 55 makes a decision as to whether the data is bound for the base station or the service provider SP, on the basis of the destination address appended to that data. If the decision is that the data is bound for the base station, then the function 55 activates the service information access control function 54 to make transfer of service information. If, on the other hand, the result is that the data is bound for the service provider, then the function 55 activates the provider access control function 51 to thereby request the service provider to make access to Internet.

The operation of the system thus arranged will be described below.

The base stations BS1 to BSj acquire an IP address "IP3" for the base stations and an IP address "IP2" to be assigned to the mobile stations PS1 to PSj in advance from the service provider SP and holds them.

Figure 8:
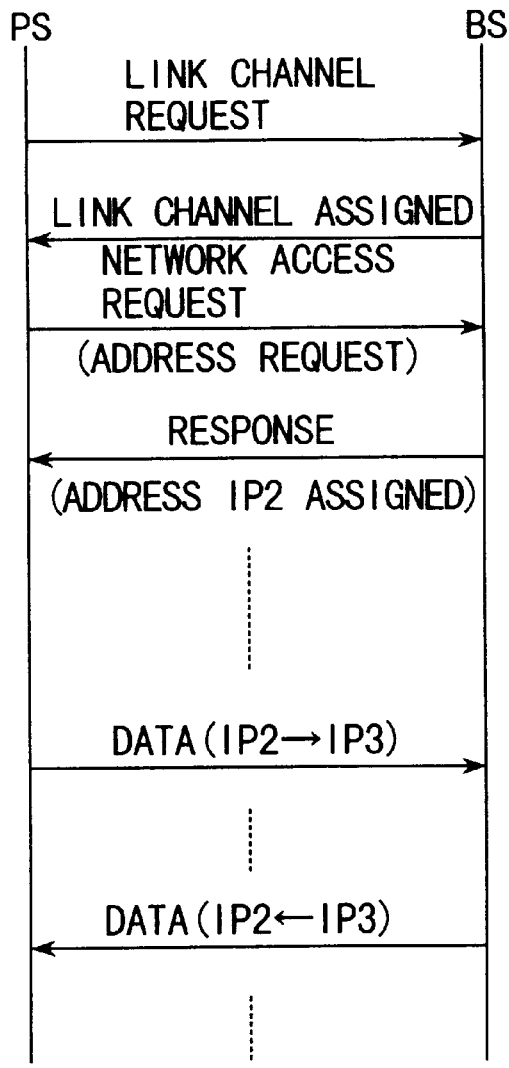
FIG. 8 illustrates the connection sequence of the mobile communications system of the second embodiment.

Assume here that the mobile station PS3 shown in FIG. 1 performs a dial operation to make a request for connection to the base station BS2 in order to obtain service information for the area where it is situated. Then, a request for establishment of a link is issued by the mobile station PS3 as shown in FIG. 8. In response to this, the base station BS2 assigns a link channel to the mobile station PS3. Thus, the connection between the mobile station PS3 and the base station BS2 is established by the radio communication link.

Figure 9:
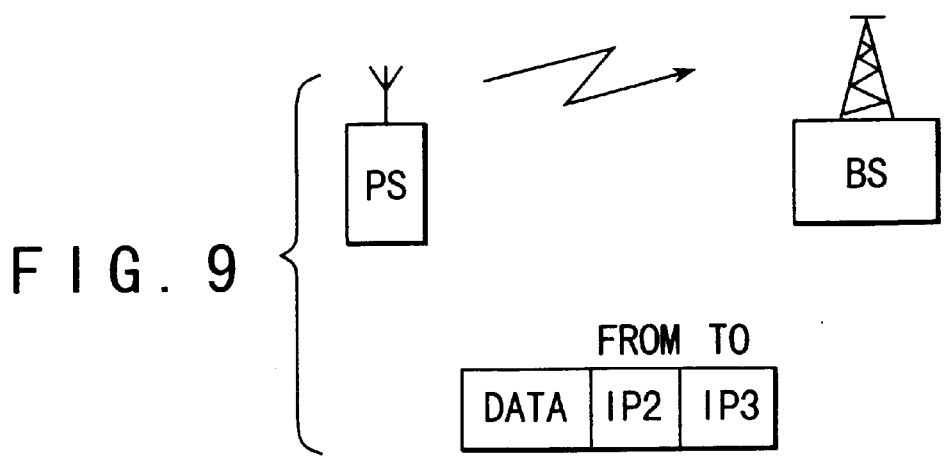
FIG. 9 is a diagram for use in explanation of data transmission in uplink direction in the second embodiment.

The mobile station PS3 next sends to the base station a request for Internet access. In response to this, the base station BS2 assigns the IP address "IP2" acquired in advance from the service provider SP to the mobile station PS3. After that, the mobile station PS3 sends data for making a request for service information transfer with the IP address "IP2" as the source address and the IP address "IP3" as the destination address. FIG. 9 shows the format of such data.

Upon receipt of data from the mobile station PS3, the base station BS2 first makes a decision as to whether the data is bound for itself or the service provider SP on the basis of the destination address in the data. If the destination of the data is the base station, it makes access to the service information storage section 61 within the memory 60 to selectively read service information corresponding to the received data contents. The service information is sent to the mobile station PS3 with the "IP2" assigned to the mobile station PS3 as the destination address and the "IP3" as the source address.

Then, the mobile station PS3 can obtain from the base station local service information for the area where it is situated.

Assume now that desired area information is not contained in the service information obtained from the base station. In such a case, with the conventional system, the mobile station PS3 would disconnect the radio communication link by terminating access to the service information storage section 61, then resend a request for connection to the service provider SP. This would require time and labor to acquire new information from a desired server on Internet.

Figure 10:
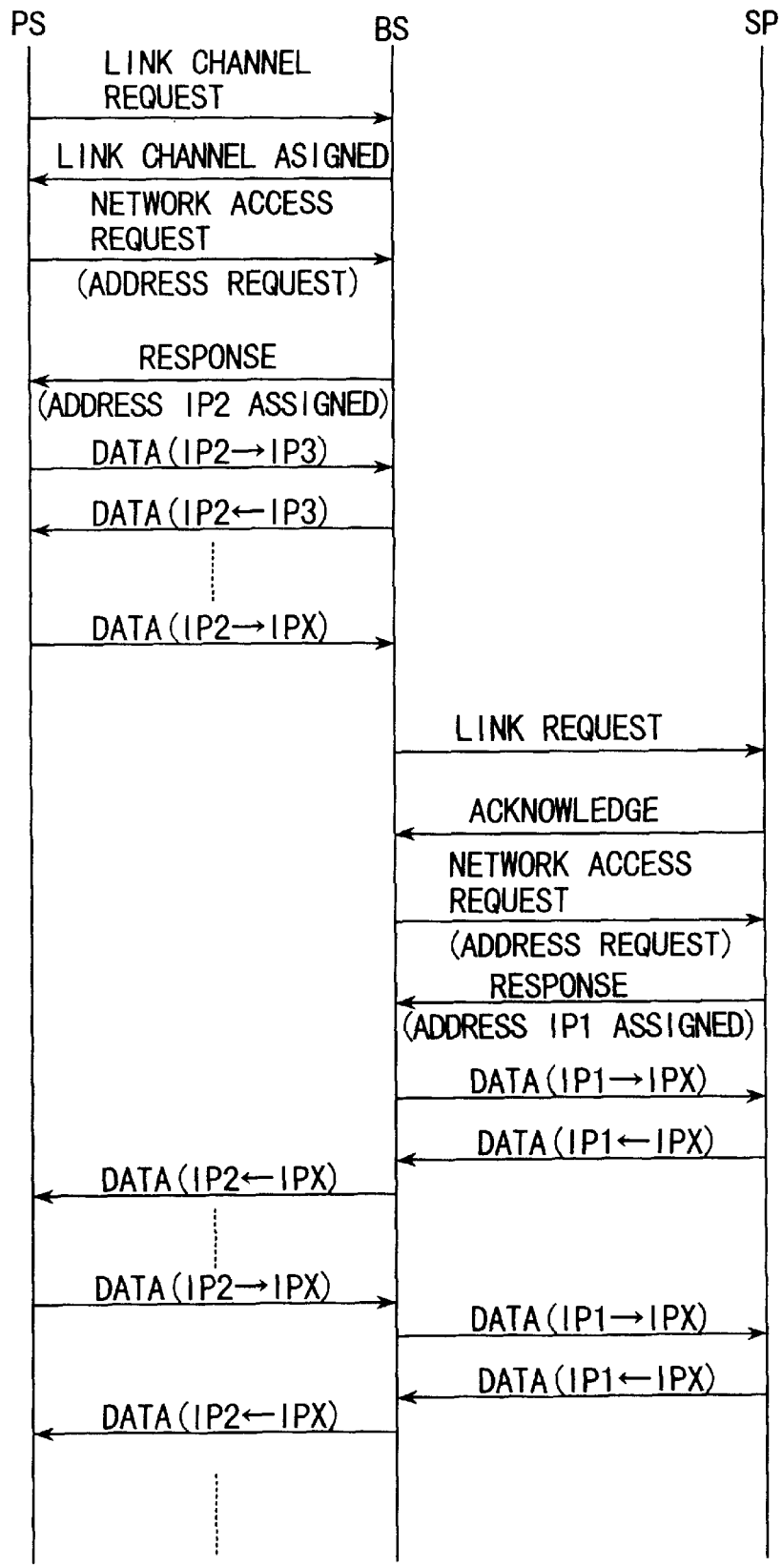
FIG. 10 illustrates the connection sequence of a third embodiment of the mobile communications system of the present invention.

The second embodiment takes the following countermeasures against the problem. FIG. 10 shows a sequence according to the second embodiment. The mobile station PS3 sends data the destination of which is a desired server on Internet without disconnecting the radio communication link. FIG. 10 shows an example of sending data with "IPx" appended as the destination address.

When recognizing that the destination address of the data received from the mobile station PS3 is IPx that is not assigned to the base stations, the base station BS2 sends a request for establishment of a link to the service provider SP as shown in FIG. 10 and, upon receipt of an acknowledge signal, sends a request for Internet access. Upon receipt of an acknowledge from the service provider SP for that request, the base station BS2 recognizes the IP address "IP1" sent together with the acknowledge as its own address.

Next, the base station BS2 transfers the data received previously from the mobile station PS3 and addressed to Internet to the service provider SP with the source address changed from "IP2" for mobile stations to its own address "IP1". Upon receipt of data from the service provider SP, the base station changes the destination address of the data from its own address "IPL" to "IP2" for mobile stations and then sends the data to the mobile station PS3.

Each time data for a server on Internet is received from the mobile station PS3 and each time data for itself is transferred from the service provider SP, the base station BS2 makes source address and destination address replacement.

Accordingly, even when making access to the service information storage section 61 in the base station BS2, the user at the mobile station PS3 can make access to a server on Internet without disconnecting the radio communication link by simply changing (replacing) the destination address of data.

On the other hand, assume that, when data transfer is made between the mobile station PS3 and the server on Internet, the mobile station PS3 sends data for the base station BS2 in order to access the service information storage section 61 in the base station BS2 again. Then, the base station BS2 recognizes that the destination of the data is changed to itself and notifies the service provider SP that the link is closed. The base station makes access to the service information storage section 61 in the memory 60 according to the data contents, reads the corresponding service information, and sends it to the mobile station PS3.

Accordingly, even when making access to a server on Internet, the user at the mobile station PS3 can make access to the service information storage section 61 without disconnecting the radio communication link by simply changing the destination address of data.

Thus, according to the second embodiment, each time data is received from a mobile station, a decision is made as to whether the destination of the data is either a base station or a service provider and the location to be accessed is changed according to the result of the decision. This allows users at mobile stations to switch between access to a base station and access to a server on Internet at their discretion without disconnecting a radio communication link to the base station by simply rewriting the destination address of the data.

The first and second embodiments are arranged such that IP address assignment control for the base stations PS1 to PSj and address replacement for data transferred between the mobile stations and the service provider SP are made by each of the base stations. These functions may be performed by a mobile switching unit installed in the public network PNW.

By so doing, access by all the mobile stations within the system to Internet can be controlled collectively by the mobile switching unit. This eliminates the base station requirement of having the various control functions described above, significantly reducing the control burden imposed on the controller of each base station. In general, a large number of base stations are installed in mobile communication systems of a cellular type. For this reason, the installation cost of the whole system can be significantly reduced by incorporating the control functions into the mobile switching unit.

In addition, the service information storage section 61, the service information access control function and the location-to-be-accessed decision function may be incorporated into the mobile switching unit, not into the base stations.

The embodiments were described taking an application of the invention to a public mobile communication system by way of example. Of course, the present invention may also be applied to private mobile communication systems employed by companies.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A mobile communication system which includes a plurality of base stations that are distributed throughout a service area and form their respective radio zones, a communication network that is connected to the base stations by communication lines and connects the base stations to a provider for providing a service of connecting the base stations to a computer network on demand, and a plurality of mobile stations each of which is linked to a base station by a radio channel within the radio zone formed by that base station, comprising:

address assignment means for, when a request for connection to the computer network is made by a mobile station, acquiring a first address from the provider and assigning to the requesting mobile station a second address that has been acquired in advance instead of the first address;

first address replacement means for, when the requesting mobile station sends data in which the second address is contained as a source address, replacing the second address in the data with the first address and transferring the data subjected to address replacement to the provider; and second address replacement means for, when the provider sends data in which the first address is contained as a destination address, replacing the first address in that data with the second address and transferring the data subjected to address replacement to the requesting mobile station.

2. The mobile communication system according to claim 1, wherein the address assignment means and the first and second address replacement means are installed in each of the base stations.

3. The mobile communication system according to claim 1, wherein the address assignment means and the first and second address replacement means are installed in the communication network.

4. The mobile communication system according to claim 1, wherein the communication network consists of a public network.

5. The mobile communication system according to claim 1, wherein the communication network is formed of a private switching unit.

6. A data transmission method for use with a mobile communication system which includes a plurality of base stations that are distributed throughout a service area and form their respective radio zones, a communication network that is connected to the base stations by communication lines and connects the base stations to a provider for providing a service of connecting the base stations to a computer network on demand, and a plurality of mobile stations each of which is linked to a base station by a radio channel within the radio zone formed by that base station, comprising:

a step of, when a request for connection to the computer network is made by a mobile station, acquiring a first address from the provider;

a step of assigning to the requesting mobile station a second address that has been acquired in advance instead of the first address;

a step of, when the requesting mobile station sends data in which the second address is contained as a source address, replacing the second address in the data with the first address and transferring the data subjected to address replacement to the provider; and a step of, when the provider sends data in which the first address is contained as a destination address, replacing the first address in that data with the second address and transferring the data subjected to address replacement to the requesting mobile station.

7. For use with a mobile communication system a radio base station unit that is linked to a mobile station by a radio channel and linked via communication network to a provider which provides a service of connection to a computer network, comprising:

address assignment means for, when a request for connection to the computer network is made by the mobile station, acquiring a first address from the provider and assigning to the requesting mobile station a second address that has been acquired in advance instead of the first address;

first address replacement means for, when the requesting mobile station sends data in which the second address is contained as a source address, replacing the second address in the data with the first address and transferring the data subjected to address replacement to the provider over the communication network; and second address replacement means for, when receiving the data over the communication network from the provider, replacing the first address as a destination address of the data with the second address and transferring the data subjected to address replacement to the destination mobile station.

8. A mobile communication system which includes a plurality of base stations that are distributed throughout a service area and form their respective radio zones, a communication network that is connected to the base stations by communication lines and connects the base stations to a provider for providing a service of connecting the base stations to a computer network on demand, and a plurality of mobile stations each of which is linked to a base station by a radio channel within the radio zone formed by that base station, comprising:

storage means for storing service information created in advance;

address assignment means for, when receiving a request for connection from a mobile station, assigning to the requesting mobile station a second address acquired in advance;

decision means for, when data is sent from the mobile station, making a decision as to whether a destination address contained in the data is a third address assigned in advance to the mobile communication system or a fourth address;

first transfer means for, when the decision means decides that the destination address is the third address, selectively reading from the storage means service information according to the data contents and transferring it to the sending mobile station; and second transfer means for, when the decision means decides that the destination address is the fourth address, acquiring a first address from the provider, changing the source address contained in the data sent from the mobile station from the second address to the first address, and transferring the data subjected to address replacement to the provider.

9. The mobile communication system according to claim 8, wherein the address assignment means, the decision means and the first and second transfer means are installed in each of the base stations.

10. The mobile communication system according to claim 8, wherein the address assignment means, the decision means and the first and second transfer means are installed in the communication network.

11. For use with a mobile communication system a radio base station unit that is linked to a mobile station by a radio channel and linked via communication network to a provider which provides a service of connection to a computer network, comprising:

storage means for storing service information created in advance;

address assignment means for, when receiving a request for connection from the mobile station, assigning to the requesting mobile station a second address acquired in advance;

decision means for, when data is send from the mobile station, making a decision as to whether a destination address contained in the data is a third address assigned in advance to the mobile communication system or a fourth address;

first transfer means for, when the decision means decides that the destination address is the third address, selectively reading from the storage means service information according to the data contents and transferring it to the sending mobile station; and second transfer means for, when the decision means decides that the destination address is the fourth address, acquiring a first address from the provider, changing a source address contained in the data sent from the mobile station from the second address to the first address, and transferring the data subjected to address replacement to the provider.

* * * * *